US009985506B2

(12) United States Patent
Shibata

(10) Patent No.: US 9,985,506 B2
(45) Date of Patent: May 29, 2018

(54) MANUFACTURING METHOD AND MAGNETIZING DEVICE FOR INTERIOR PERMANENT MAGNET ROTOR UNIT

(71) Applicant: JTEKT CORPORATION, Osaka-shi, Osaka (JP)

(72) Inventor: Yoshiyuki Shibata, Toyota (JP)

(73) Assignee: JTEKT CORPORATION, Osaka-shi (JP)

(*) Notice: Subject to any disclaimer, the term of this patent is extended or adjusted under 35 U.S.C. 154(b) by 242 days.

(21) Appl. No.: 15/166,907

(22) Filed: May 27, 2016

(65) Prior Publication Data
US 2016/0359398 A1 Dec. 8, 2016

(30) Foreign Application Priority Data
Jun. 2, 2015 (JP) .................................. 2015-112129

(51) Int. Cl.
*H02K 15/02* (2006.01)
*H02K 15/10* (2006.01)
*H02K 15/03* (2006.01)
*H02K 1/27* (2006.01)
*H01F 13/00* (2006.01)
*H01F 41/02* (2006.01)

(52) U.S. Cl.
CPC ............. *H02K 15/03* (2013.01); *H02K 1/276* (2013.01); *H01F 13/003* (2013.01); *H01F 41/0253* (2013.01); *Y10T 29/49012* (2015.01)

(58) Field of Classification Search
CPC .. H02K 1/2713; H02K 1/2793; H02K 41/031; H02K 15/03; H02K 1/272; H01F 13/003; H01F 41/0253; Y10T 29/49012; Y10T 29/49076

USPC .................................... 29/598, 596, 607, 810
See application file for complete search history.

(56) References Cited

U.S. PATENT DOCUMENTS

| 5,258,735 A * | 11/1993 | Allwine, Jr. ............. G01B 7/30 335/302 |
| 7,768,170 B2 * | 8/2010 | Tatematsu .............. H02K 1/278 310/156.35 |
| 9,490,669 B2 * | 11/2016 | Yamada ............... H02K 1/2706 |

FOREIGN PATENT DOCUMENTS

| EP | 2 897 264 A2 | 7/2015 |
| EP | 3012947 A2 | 4/2016 |
| JP | 2014-121116 A | 6/2014 |
| JP | 2016082778 A | 5/2016 |
| WO | 2007/141147 A1 | 12/2007 |

OTHER PUBLICATIONS

Nov. 3, 2016 Extended Search Report issued in European Patent Application No. 16171727.7.

* cited by examiner

*Primary Examiner* — Thiem Phan
(74) *Attorney, Agent, or Firm* — Oliff PLC

(57) ABSTRACT

In a method for manufacturing an interior permanent magnet rotor unit, a radial magnetizing part including high magnetic permeability portions and low magnetic permeability portions face a core, and a magnetic field of axial magnetizing parts is applied to the radial magnetizing part in an axial direction of the radial magnetizing part. This causes the magnetic field to enter the core via the radial magnetizing part and cross magnet materials filling insertion holes of the core.

9 Claims, 7 Drawing Sheets

MANUFACTURING METHOD AND MAGNETIZING DEVICE FOR INTERIOR PERMANENT MAGNET ROTOR UNIT

INCORPORATION BY REFERENCE

The disclosure of Japanese Patent Application No. 2015-112129 filed on Jun. 2, 2015 including the specification, drawings and abstract, is incorporated herein by reference in its entirety.

BACKGROUND OF THE INVENTION

1. Field of the Invention

The present invention relates to a method for manufacturing an interior permanent magnet (IPM) rotor unit that includes a core and a plurality of permanent magnets embedded in insertion holes of the core, the IPM rotor unit or a plurality of IPM rotor units counted in the axial direction thereof forming a rotor. The present invention also relates to a magnetizing device.

2. Description of Related Art

For example, Japanese Patent Application Publication No. 2014-121116 (JP 2014-121116 A) proposes magnetizing magnetic members for magnets (magnet materials) embedded in a rotor by disposing a magnetizing part serving as a source of a magnetic field so that the magnetizing part is caused to face the end face of the rotor in the radial direction thereof (FIG. 3). Magnetic flux from the magnetizing part enters a core in the radial direction of the rotor, crosses the magnet material, and returns to the magnetizing part. The magnet material is magnetized in this manner.

For example, when the core is filled with the magnet material at high pressure, a lame force is applied radially outward to the core. In the filling of the core with the magnet material, if the magnetizing part is disposed so as to face the core in the radial direction, the core is difficult to be kept from expanding radially outward. This is partly because it is difficult to cause the magnetizing part to have a strength large enough to prevent the core from expanding radially outward.

SUMMARY OF THE INVENTION

It is an object of the present invention to provide a method for manufacturing an IPM rotor unit, and to provide a magnetizing device, the method and the device being capable of applying a magnetic field in a radial direction to a magnet material filling a core without disposing a source of the magnetic field radially outside the core.

According to one aspect of the present invention, a method is provided for manufacturing an interior permanent magnet rotor unit that includes a core having a plurality of insertion holes arranged in a circumferential direction of the core and permanent magnets embedded in the insertion holes of the core, the rotor unit or a plurality of the rotor units being coupled in an axial direction of the core to form a rotor. The method includes magnetizing a magnet material filling the insertion holes by using a magnetizing device. The magnetizing device includes an axial magnetizing part serving as a source of a magnetic field and a radial magnetizing part having an inner peripheral surface that faces the core in a radial direction of the core. The radial magnetizing part is formed by alternately arranging low magnetic permeability portions and high magnetic permeability portions having higher magnetic permeability than the low magnetic permeability portions in a circumferential direction of the radial magnetizing part. In the magnetizing, the radial magnetizing part is disposed so that the low magnetic permeability portions face the magnet materials in the radial direction of the core, the axial magnetizing part is disposed so as to face the radial magnetizing part in the axial direction of the core, and the axial magnetizing part applies the magnetic field toward the radial magnetizing part to apply the magnetic field to the magnet materials via the radial magnetizing part.

In the above method, the axial magnetizing part applies the magnetic field toward the radial magnetizing part to apply the magnetic field to the core via the radial magnetizing part so that the magnet materials are magnetized. In other words, a magnetic flux from the axial magnetizing part enters the core in the radial direction thereof via the radial magnetizing part, so that the magnet materials are magnetized. This allows the magnetic field to be applied in the radial direction to the magnet materials filling the core without the need to dispose the source of the magnetic field radially outside the core.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
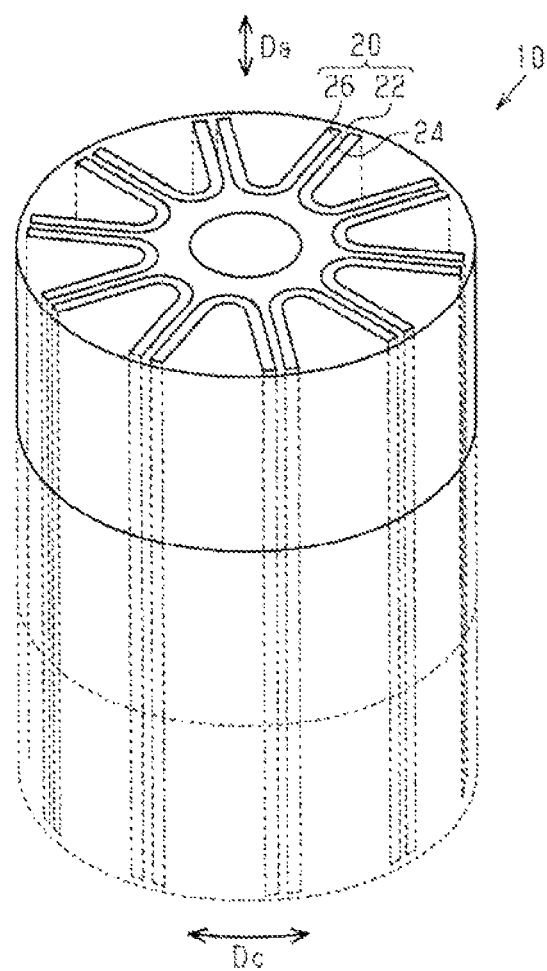
FIG. 1 is a perspective view showing the configuration of an interior permanent magnet rotor unit according to a first embodiment of the present invention.

The following describes a method for manufacturing, and a device for magnetizing, an interior permanent magnet rotor unit according to a first embodiment of the present invention with reference to the accompanying drawings.

A rotor 10 shown in FIG. 1 forms an interior permanent magnet synchronous machine (hereinafter referred to as "IPMSM"). The IPMSM is built in an electric power steering device (EPS). The rotor 10 has a cylindrical shape. The rotor 10 according to the present embodiment is formed by coupling three interior permanent magnet rotor units (rotor units 20) in a direction in which the rotation axis of the rotor 10 extends (axial direction Da).

Each rotor unit 20 includes a core 22 and permanent magnets 26. The core 22 is formed by stacking a plurality of electromagnetic steel sheets. The core 22 has 10 insertion holes 24 extending therethrough in the axial direction Da. Each insertion hole 24 has a substantially U-shape in section perpendicular to the axial direction Da. The insertion holes 24 are disposed at regular intervals in the circumferential direction Dc of the core 22. The permanent magnets 26 are embedded in the insertion holes 24. A material with the surface of magnetic particles thereof coated with resin is used as a magnet material of the permanent magnets 26, and the permanent magnets 26 are produced by magnetizing the magnet material.

A method for manufacturing the rotor unit 20 will be described below. In the present embodiment, using the core 22 as a mold, a filling step of filling the insertion holes 24 with the magnet material is performed, and then a compressing step of compressing the permanent magnets is performed. The periods of the filling step and the compressing step are included in the period of a magnetizing step of applying a magnetic field to the magnet material. This is a setting to increase the magnetization rate and the orientation rate of each of the permanent magnets 26. As used herein, the orientation rate refers to the degree to which the easy magnetization directions are aligned with the direction perpendicular to the surface of the permanent magnet 26. As the orientation rate is lower, the magnetic flux eventually leaving the N pole and entering the S pole of the permanent magnet 26 produced by magnetization has lower density. In the present embodiment, the period of the magnetizing step includes the period of the step (filling step) in which the magnetic particles can be easily displaced prior to the compressing step so that the orientation rate is increased. The magnetization rate refers to the degree to which the magnetic moment (magnetization direction) of a local area (magnetic domain) in the permanent magnet 26 is aligned with either one of the easy magnetization directions. That is, even if the orientation rate is high, the magnetic flux leaving the N pole and entering the S pole of the permanent magnet 26 has lower density as the degree to which the magnetic moment aligned with either one of the pair of easy magnetization direction is lower. In the present embodiment, not only the magnetization rate but also the orientation rate are increased to increase the speed electromotive force coefficient of the IPMSM, and thus to increase torque generated by the IPMSM when a current of a predetermined magnitude is applied thereto. In the present embodiment, the performance of the rotor unit 20 is defined by the magnitude of the torque generated by the IPMSM when a predetermined current is applied thereto. That is, higher torque is generated as the performance is higher.

Figure 2:
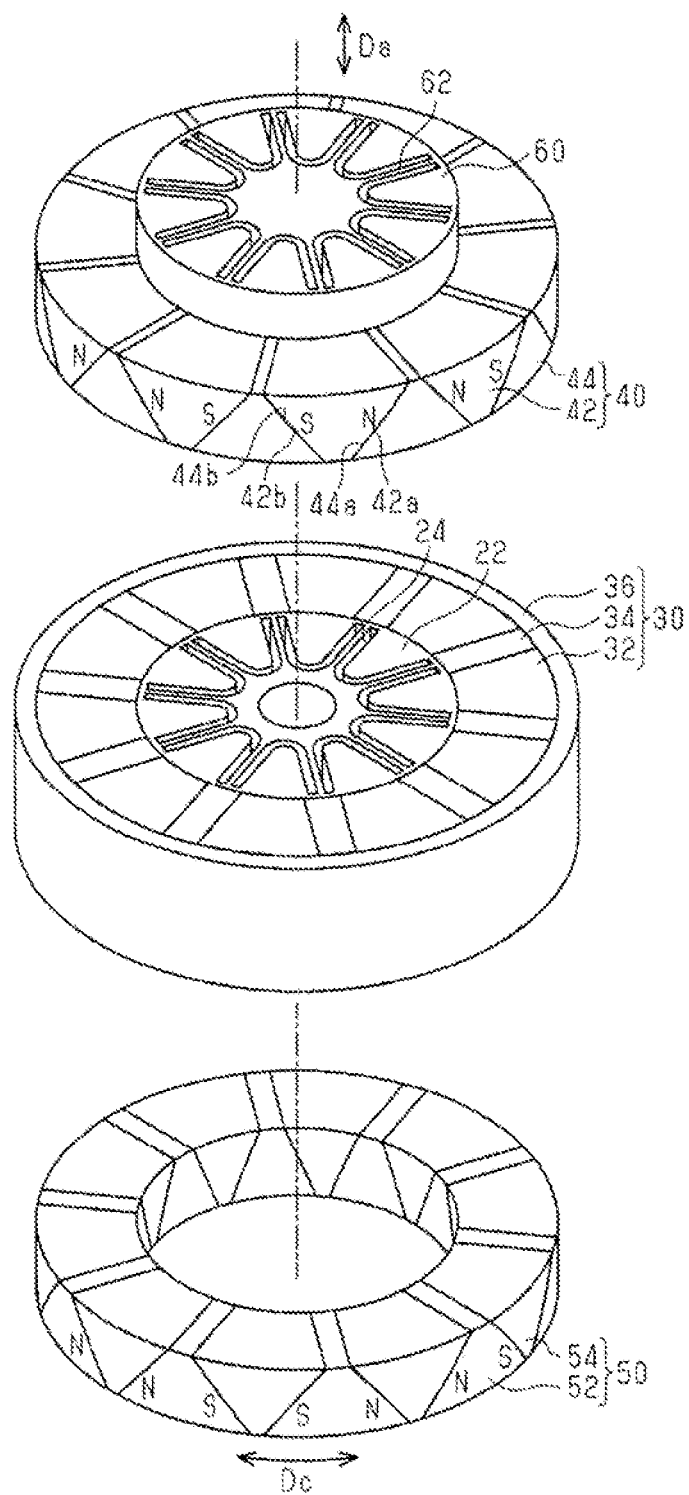
FIG. 2 is an exploded perspective view showing the configuration of a magnetizing device and a forming device according to the first embodiment.

FIG. 2 shows the magnetizing device and the rotor unit 20 according to the present embodiment. FIG. 2 shows a state where each of the insertion holes 24 of the core 22 are not filled with the magnet material. The axial direction Da and the circumferential direction Dc will be used in the following description of the magnetizing device in some cases. Such description is based on the positional relationship between the core 22 and the magnetizing device when the magnet material is magnetized.

A radial magnetizing part 30 shown in FIG. 2 includes ten high magnetic permeability portions 32 and ten low magnetic permeability portions 34 that are alternately arranged in the circumferential direction Dc of the rotor unit 20. The high and low magnetic permeability portions 32 and 34 are formed into a single-piece annular body by a restraining ring 36. The high magnetic permeability portions 32 are made of permendur. The low magnetic permeability portions 34 are made of stainless steel. The low magnetic permeability portions 34 accordingly have lower magnetic permeability than the high magnetic permeability portions 32. In the present embodiment, the high magnetic permeability portions 32 have higher magnetic permeability than the core 22.

Each of the low magnetic permeability portions 34 has the same length in the circumferential direction Dc at all radial locations thereof. Each of the high magnetic permeability portions 32, in contrast, has a length in the circumferential direction Dc increasing radially outward. In other words, the high magnetic permeability portion 32 has a fan shape in section perpendicular to the axial direction Da.

In the present embodiment, the radial magnetizing part 30 has the same length in the axial direction Da as the length of the core 22 in the axial direction Da. The inside diameter of the radial magnetizing part 30 is set slightly larger than the outside diameter of the core 22. This setting allows the outer peripheral surface of the core 22 to be disposed so as to face the radial magnetizing part 30 in the radial direction.

An axial magnetizing part 40 includes ten permanent magnets 42 and ten magnetizing yokes 44 that are alternately arranged in the circumferential direction Dc. The permanent magnets 42 and the magnetizing yokes 44 are formed into a single-piece annular body by a nonmagnetic member (not shown). The axial magnetizing part 40 has the same outside diameter as the outside diameter of the radial magnetizing part 30, and has the same inside diameter as the inside diameter of the radial magnetizing part 30.

Each of the magnetizing yokes 44 of the axial magnetizing part 40 has a trapezoidal shape in section perpendicular to the radial direction of the core 22, and is formed so as to decrease in width in the circumferential direction Dc from the bottom surface thereof serving as an end face on the core 22 side toward the top surface thereof. This forms both side faces of the magnetizing yoke 44 into inclined surfaces that form acute angles with the axial direction Da. Side faces 44a and 44b of each adjacent pair of the magnetizing yokes 44 Thee each other in the circumferential direction Dc. The permanent magnets 42 are each interposed between corresponding side faces 44a and 44b.

Each of the permanent magnets 42 also has a trapezoidal shape in section perpendicular to the radial direction of the core 22. More in detail, the permanent magnet 42 has a rectangular bottom surface with a size covering an end face in the axial direction Da of each of the low magnetic permeability portions 34, and is formed so as to increase in width in the circumferential direction Dc from the bottom surface thereof serving as an end face on the core 22 side toward the top surface thereof. Thus, the side faces 42a and 42b of the permanent magnet 42 in the circumferential direction Dc are formed into inclined surfaces inclining with respect to the axial direction Da toward an end face of the rotor unit 20 in the axial direction Da. The side faces 42a and 42b are in contact with the side faces 44a and 44b, respectively, of a corresponding pair of the magnetizing yokes 44.

The permanent magnet 42 has different magnetic poles on the side faces 42a and 42b each adjacent to corresponding one of the pair of the magnetizing yokes 44. The permanent magnets 42 are arranged so that the side face 42a of one permanent magnet 42 and the side face 42b of the permanent magnet 42 adjacent thereto in the circumferential direction Dc have the same magnetic pole. The permanent magnets 42 are sintered magnets.

An axial magnetizing part 50 has the same configuration as the axial magnetizing part 40. Specifically, the axial magnetizing part 50 includes ten permanent magnets 52 and ten magnetizing yokes 54 that are alternately arranged in the circumferential direction Dc. The permanent magnets 52 and the magnetizing yokes 54 are formed into a single-piece annular body by a nonmagnetic member (not shown).

A forming guide 60 has the same outside diameter as the outside diameter of the core 22. The forming guide 60 includes ten guide holes 62 penetrating therethrough in the axial direction Da. Each of the guide holes 62 has a substantially U-shaped section perpendicular to the axial direction Da. The sectional shape of the guide holes 62 is the same as the sectional shape of insertion holes 24 of the core 22. The forming guide 60 is made of a nonmagnetic material, and specifically, made of stainless steel.

Figure 3A:
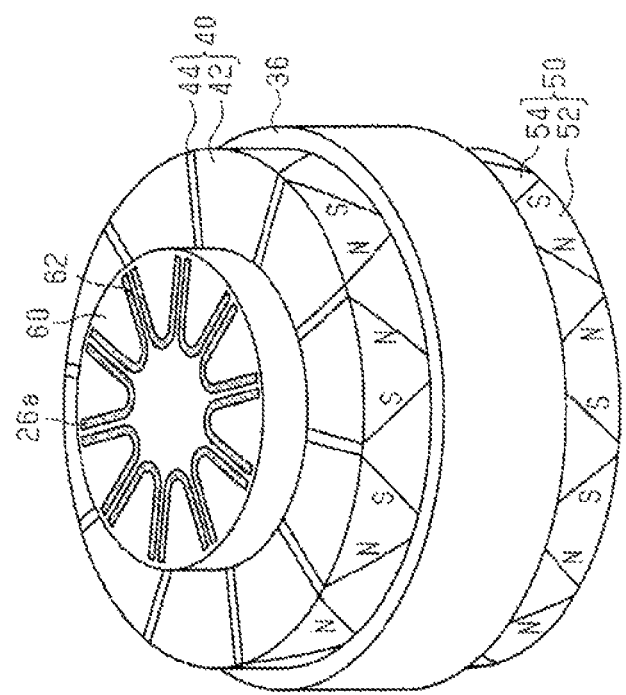
FIG. 3A is a perspective view showing a filling step and a compressing step.

FIG. 3A shows the state of completion of the filling step where each of the guide holes 62 and the insertion holes 24 is filled with as magnet material 26a. Prior to the filling step, with the core 22 inserted in the radial magnetizing part 30, the axial magnetizing parts 40 and 50 are disposed so as to face the opposite end faces of the radial magnetizing part 30 in the axial direction Da, and the forming guide 60 is inserted into the axial magnetizing part 40. The low magnetic permeability portions 34 of the radial magnetizing part 30 is disposed so as to face the insertion holes 24 in the radial direction. The permanent magnets 42 and 52 of the axial magnetizing parts 40 and 50 are in contact with the low magnetic permeability portions 34 of the radial magnetizing part 30, and cover the end faces of the low magnetic permeability portions 34 in the axial direction Da. The forming guide 60 is disposed so that the guide holes 62 are connected to the insertion holes 24. Thus, in the filling step, filling the guide holes 62 with the magnet materials 26a fills also the insertion holes 24 with the magnet materials 26a.

In FIG. 3A, a restricting member is disposed so as to face the inner peripheral surface of the axial magnetizing part 50. The restricting, member restricts the core 22 from being displaced toward the axial magnetizing part 50. The restricting member only needs to be, for example, a circular cylindrical member having the same outside diameter as that of the core 22.

Figure 3B:
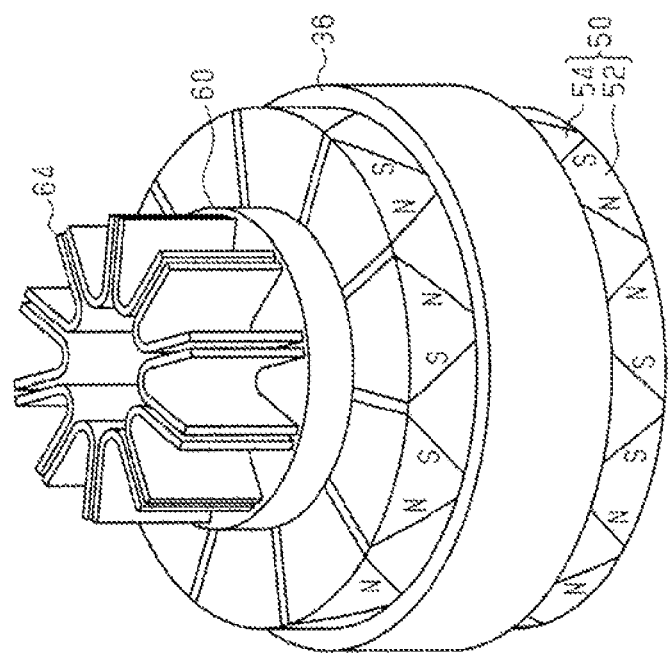
FIG. 3B is a perspective view showing the filling step and the compressing step.

FIG. 3B shows the compressing step of compressing the magnet materials 26a. In the present embodiment, punches 64 are inserted into the guide holes 62 to compress the magnet materials 26a. Each of the punches 64 has an outer peripheral shape that conforms to the inner peripheral shape of the guide hole 62. Inserting the punches 64 presses the magnet materials 26a in the guide holes 62 into the core 22. In the present embodiment, a core 22-side end, of a pair of ends of the punch 64 in the axial direction Da, is displaced to an end of the core 22 in the axial direction Da so as to press all the magnet materials 26a in the guide holes 62 into the insertion holes 24. Thus, the compressing step is finished. The compressing step causes the resin that has coated the magnetic particles to bond the magnetic particles to one another, and thus forms the permanent magnets 26 in the insertion holes 24 of the core 22. In this step, the magnet materials 26a only need to be subjected to pressure of several tens to several hundreds of megapascals (for example, one hundred and several tens of megapascals).

A lapse of a predetermined period from the end of the compressing step terminates the magnetizing step. That is, the core 22 is taken out of the radial magnetizing part 30.

Functions of the present embodiment will be described below.

In the filling step, the axial magnetizing parts 40 and 50 are disposed so as to face the radial magnetizing part 30. Hence, the magnetic field is applied to the magnet materials 26a via the radial magnetizing part 30 when the magnetic held is applied from the axial magnetizing parts 40 and 50 toward the radial magnetizing part 30.

Figure 4:
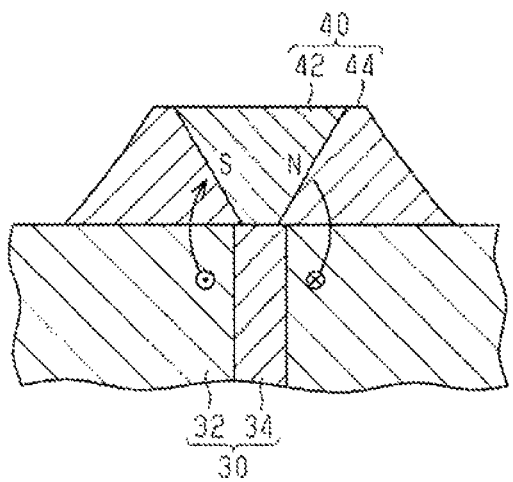
FIG. 4 is a sectional view showing a path of a magnetic flux from an axial magnetizing part to a radial magnetizing part according to the first embodiment.

FIG. 4 shows a section of the axial magnetizing part 40 and the radial magnetizing part 30. As shown in FIG. 4, the magnetic flux from the N pole of the axial magnetizing part 40 enters one of the high magnetic permeability portions 32 of the radial magnetizing part 30 via adjacent one of the magnetizing yokes 44. The magnetic flux bypasses the low magnetic permeability portion 34 adjacent to the high magnetic permeability portion 32, and passes through the core 22, the magnet material 26a, and the core 22 to enter the high magnetic permeability portion 32 that is adjacent with the low magnetic permeability portion 34 interposed therebetween. The magnetic flux that has entered the high magnetic permeability portion 32 enters the S pole of the permanent magnet 42 via another one of the magnetizing yokes 44.

Figure 5:
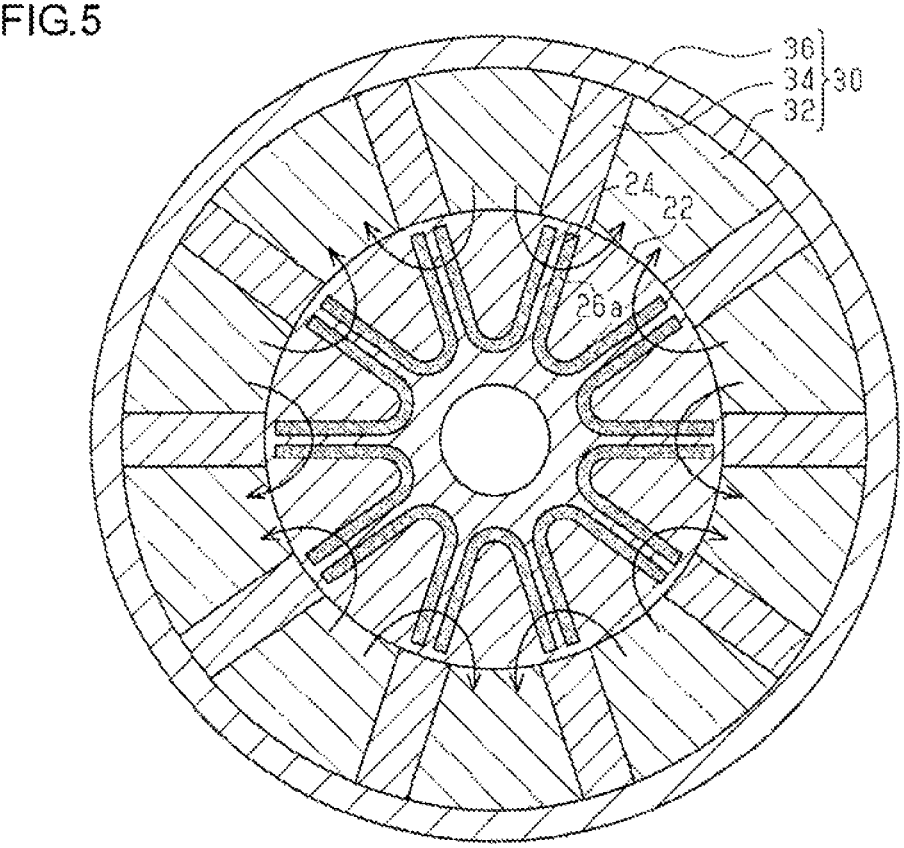
FIG. 5 is a sectional view showing a path of the magnetic flux from the radial magnetizing part to a core according to the first embodiment.

FIG. 5 shows a section of the radial magnetizing part 30 and the core 22. As shown in FIG. 5, the magnetic flux from the N pole of the permanent magnet 42 shown in FIG. 4 enters the core 22 via the high magnetic permeability portion 32, crosses the magnet materials 26a tilling a pair of the insertion holes 24 from the core, and enters the adjacent high magnetic permeability portion 32 via the core 22.

Thus, the magnet materials 26a filling the insertion holes 24 are magnetized. In a period prior to the compressing step and the initial period of the compressing step, the magnetic particles forming the magnet materials 26a in the insertion holes 24 can be relatively easily displaced by as small amount, so that the passing of the magnetic flux changes the easy magnetization directions of the magnetic particles to the direction of the magnetic flux. Thus, in the present embodiment, the magnetic flux crossing the magnet materials 26a can increase not only the magnetization rate but also the orientation rate. This enables manufacturing of the high-performance rotor unit 20.

The present embodiment described above provides the following effects.

(1) The magnetic field is applied from the axial magnetizing parts 40 and 50 toward the radial magnetizing part 30 so as to apply the magnetic field to the core 22 via the radial magnetizing part 30, and thus to magnetize the magnet materials 26a. This allows the magnetic field to be applied in the radial direction to the magnet materials 26a filling the core 22 without the need to dispose the source of the magnetic field radially outside the core 22.

(2) The axial magnetizing part 40 has a circular cylindrical shape, and the inner peripheral surface thereof has a diameter equal to or larger than the diameter of the core 22. The forming guide 60 is inserted into the axial magnetizing part 40. This allows the forming guide 60 to be disposed on the end face of the core 22 in the axial direction Da.

(3) The magnetizing step includes the period from the start of the compressing step to the end of the compressing step. In this case, the core 22 applies a large force to the radial magnetizing part 30 in the compressing step. Hence, a situation can occur where the strength of the radial magnetizing part 30 is insufficient if the radial magnetizing part 30 is made of, for example, sintered magnets. Thus, it is significantly advantageous to provide the axial magnetizing parts 40 and 50 as the source of the magnetic field.

If the strength of the radial magnetizing part 30 is insufficient, the reliability of the radial magnetizing part 30 may decrease. In addition, the core 22 expands in the radial direction, so that it becomes impossible to ensure the clearance between the rotor and the stator of the IPMSM. Thus, the stator may come into contact with the rotor.

(4) The magnetizing step includes the period of the filling step. In the filling step, since pressure is not applied to the magnet materials 26a, the magnetic field is applied to the magnet materials 26a in the state where the magnet materials 26a can be easily displaced. This allows the easy magnetization directions of the magnet materials 26a to be easily aligned, and can consequently increase the orientation rate of the permanent magnets 26.

(5) The axial magnetizing parts 40 and 50 are disposed so as to face the opposite end faces of the core 22 in the axial direction Da. This facilitates reduction of variation in the magnetization rate and the orientation rate in the axial direction Da of the permanent magnets. Specifically, the magnetic resistance of paths of the magnetic flux (magnetic paths) starting from the axial magnetizing parts 40 and 50 and returning thereto via the radial magnetizing part 30, the core 22, and the radial magnetizing part 30 increases with increase in distances in the axial direction Da between the magnetic paths in the core 22 and the respective axial magnetizing parts 40 and 50. Accordingly, the density of the magnetic flux that has entered the core from the axial magnetizing parts 40 and 50 tends to be higher in positions closer to the respective axial magnetizing parts 40 and 50 than in positions farther therefrom. This can cause the magnetization rate and the orientation rate of the magnet materials 26a to vary depending on its position in the axial direction Da. In this respect, in the present embodiment, the axial magnetizing parts 40 and 50 are disposed on the opposite sides of the core 22 in the axial direction Da so as to suppress increase in the maximum distance in the axial direction Da between each of the axial magnetizing parts 40 and 50 and the magnet materials 26a.

(6) The restraining ring 36 is provided. This causes the restraining ring 36 to resist the force applied by the core 22 radially outward to the high magnetic permeability portions 32 and the low magnetic permeability portions 34 in the compressing step, and can thereby maintain the low magnetic permeability portions 34 and the high magnetic permeability portions 32 in the connected state in the compressing step.

Moreover, when the high magnetic permeability portions 32 are connected with the low magnetic permeability portions 34 only with the restraining ring 36, the radial magnetizing part 30 can be easily removed from the core 22 even if the radial clearance between the core 22 and the radial magnetizing part 30 is excessively small. Specifically, in this case, removing the restraining ring 36 can separate the high magnetic permeability portions 32 from the low magnetic permeability portions 34, and can thus remove the radial magnetizing part 30 from the core 22.

(7) The restraining ring 36 is made of a nonmagnetic material. This can suppress the occurrence of a situation in which the magnetic flux from the axial magnetizing parts 40 and 50 passes through the restraining ring 36 and enters the axial magnetizing parts 40 and 50, so as to bypass the high magnetic permeability portions 32 and the core 22.

(8) The forming guide 60 is made of a nonmagnetic material. In this case, the forming guide 60 has lower magnetic permeability than the core 22. Therefore, it is possible to suppress the occurrence of a situation in which the magnetic flux from the permanent magnets 42 of the axial magnetizing part 40 passes through the forming guide 60 and returns to the permanent magnets 42 so as to bypass the core 22.

(9) The axial magnetizing part 50 has a circular cylindrical shape. This allows the restricting member for restricting the displacement of the core 22 in the axial direction Da to be inserted into the axial magnetizing part 50. Thus, it is possible to suppress the occurrence of a situation in which a force large enough to reduce the reliability is applied to the axial magnetizing part 50 in the compressing step.

A second embodiment of the present invention will be described below with reference to the accompanying drawings by focusing on the differences from the first embodiment.

In the first embodiment, the forming guide 60 is disposed outside the radial magnetizing part 30. In the present embodiment, the forming guide 60 is disposed so that a part of the forming guide 60 faces the inner peripheral surface of the radial magnetizing part 30.

Figure 6:
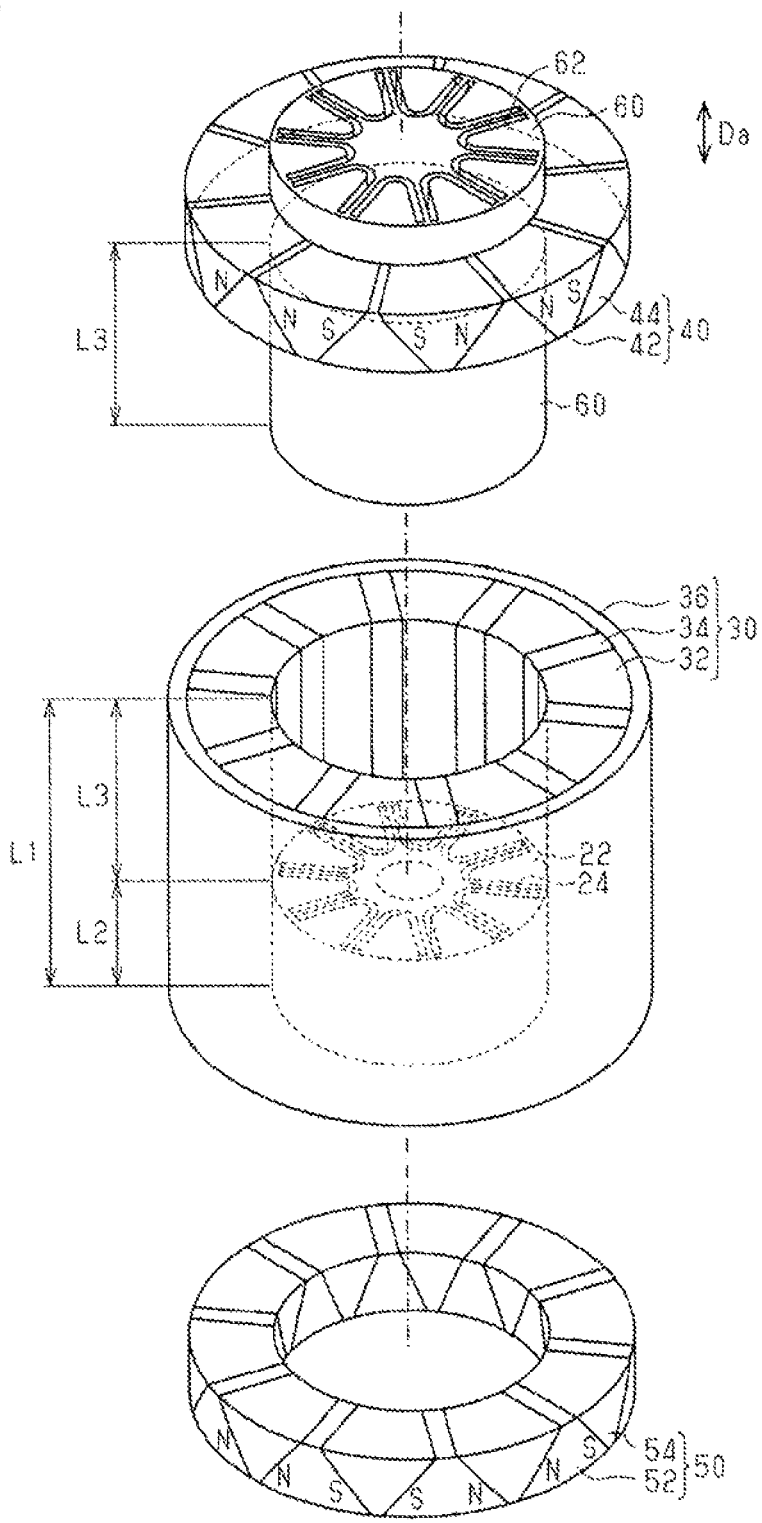
FIG. 6 is an exploded perspective view showing the configuration of a magnetizing device and a forming device according to a second embodiment of the present invention.

FIG. 6 shows an exploded perspective view of a magnetizing device according to the present embodiment. As shown in FIG. 6, in the present embodiment, a length L1 of the radial magnetizing part 30 in the axial direction Da is larger than a length L2 of the core 22 in the axial direction Da. With this dimension setting, a portion of the forming guide 60 having a length of L3 (=L1−L2) in the axial direction Da is inserted into the radial magnetizing part 30. A portion of each of the guide holes 62 in the forming guide 60, which has the length L3 in the axial direction Da from the core 22 side thereof, is filled with the magnet material 26a.

In the present embodiment, the forming guide 60 is made of a magnetic material. Specifically, the thrilling guide 60 is made of permendur.

In this case, in the filling step of filling the guide holes 62 and the insertion holes 24 with the magnet materials 26a, the magnetic flux that has entered the radial magnetizing part 30 from the axial magnetizing parts 40 and 50 enters not only the core 22 but also the forming guide 60 in the radial direction. The magnetic flux that has entered the forming guide 60 in the radial direction crosses the magnet materials 26a filling the guide holes 62, and returns to the radial magnetizing part 30. This can align the easy magnetization directions of the magnet materials 26a in the forming guide 60 with the direction of the magnetic flux. The orientation rate of the permanent magnets 26 is considered to be more effectively increased by applying the magnetic field to the magnet materials 26a before the compressing step than in the compressing step. Therefore, the present embodiment can more easily increase the orientation rate of the permanent magnets 26.

A third embodiment of the present invention will be described below with reference to the accompanying drawings by focusing on the differences from the second embodiment.

In the second embodiment, the forming guide 60 is disposed so as to face only one end of the core 22 in the axial direction Da. In the present embodiment, forming guides 60 and 70 are disposed so as to face both ends of the core 22 in the axial direction Da, as shown in FIG. 7.

Figure 7:
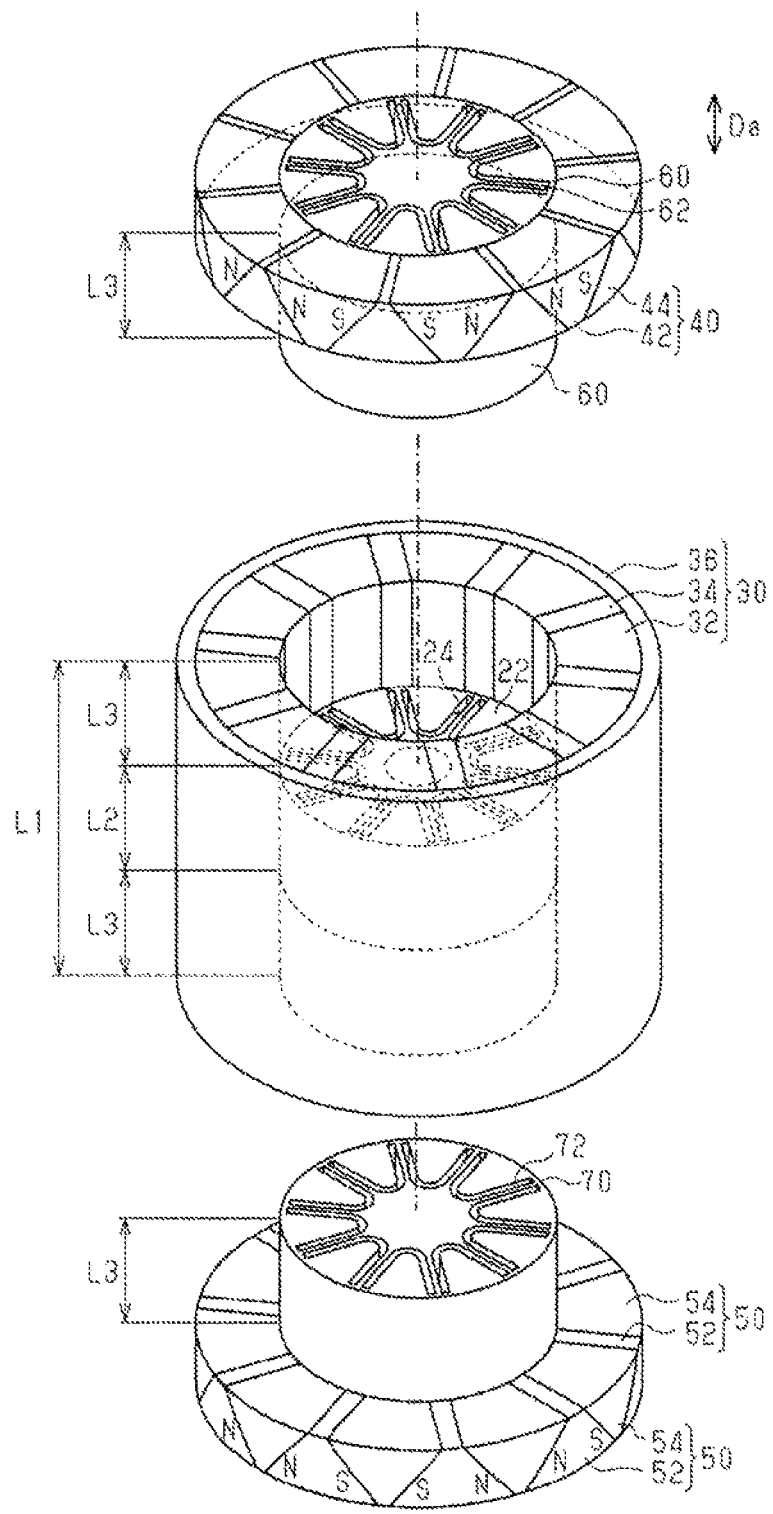
FIG. 7 is an exploded perspective view showing the configuration of a magnetizing device and a forming device according to a third embodiment of the present invention.

FIG. 7 shows an exploded perspective view of a magnetizing device according to the present embodiment. As shown in FIG. 7, in the present embodiment, the length L1 of the radial magnetizing part 30 in the axial direction Da is larger than the length L2 of the core 22 in the axial direction Da. The forming guides 60 and 70 are disposed so as to be inserted, each by the length L3, from the opposite sides of the radial magnetizing part 30 in the axial direction Da. In the present embodiment, the forming guide 70 is also made of a magnetic material, and specifically, made of permendur.

Under the arrangement described above, the guide holes 62 of the forming guide 60, guide holes 72 of the forming guide 70, and the insertion holes 24 of the core 22 are filled with the magnet materials 26a as the filling step. In this case, a portion of each of the guide holes 62 in the forming guide 60 and the guide holes 72 in the forming guide 70, which has the length L3 in the axial direction Da from the core 22 side thereof, is filled with the magnet material 26a. The magnet materials 26a are compressed with punches from the guide holes 62 and the guide holes 72 toward the insertion holes 24. This compressing step is completed when the distal ends of the punches reach the ends of the insertion holes 24.

At least one of the items of the embodiments described above may be changed as described below. In the above embodiments, the forming guide 60 or 70 has the same outside diameter as the outside diameter of the core 22. However, the present invention is not limited to this. For example, if the distance between the insertion holes 24 and the outer periphery of the core 22 is large, the outside diameter of the forming guide 60 or 70 can be easily set smaller than the outside diameter of the core 22 even when the guide holes 62 or 72 of the forming guide 60 or 70 are formed to be connectable to the insertion holes 24.

In the first embodiment, the forming guide 60 is made of stainless steel. However, the nonmagnetic material is not limited to this. The forming guide 60 does not need to even be made of a nonmagnetic material, but may be made of a magnetic material. In this case, a larger amount of the magnetic flux from the axial magnetizing part 40 crosses the magnet materials 26a in the guide holes 62 via the forming guide 60, so that the magnetic field can be applied to the magnet materials 26a that have been put in the guide holes 62 of the forming guide 60 in the filling step.

While the forming guide 60 is made of permendur in the second embodiment, the present invention is not limited to this. Similarly, while the forming guides 60 and 70 are made of permendur in the third embodiment, the present invention is not limited to this. The forming guide 60 or 70 may be made of, for example, cast iron or soft iron. The forming guide 60 of the second embodiment and the forming guides 60 and 70 of the third embodiment do not need to even be made of a magnetic material. If the forming guide 60 or 70 has higher magnetic permeability than the low magnetic permeability portions 34 of the radial magnetizing part 30, for example, a nonmagnetic material can be used for the forming guide to ensure the amount of magnetic flux that bypasses the low magnetic permeability portions 34, enters the forming guide 60 or 70, and passes through the magnet materials 26a.

In the first embodiment (FIG. 2) and the second embodiment (FIG. 6), the axial magnetizing part 50 in which the forming guide 60 is not inserted may have a smaller inside diameter than the outside diameter of the core 22. Also in this case, as long as the axial magnetizing part 50 has a circular cylindrical shape, the restricting member for restricting the core 22 from being displaced in the axial direction Da toward the axial magnetizing part 50 can be inserted into the axial magnetizing part 50. In this case, in the compressing step, the restricting member can receive a force from the core 22 in the axial direction Da toward the axial magnetizing part 50 so as to reduce or avoid the application of the force to the axial magnetizing part 50. In this case, in the magnetizing step, the magnetic field can be applied in the axial direction Da to the core 22 from a portion of the axial magnetizing part 50 disposed inside the inner periphery of the radial magnetizing part 30.

The permanent magnets 42 and 52 are not limited to the sintered magnets, but may be samarium magnets, such as samarium-cobalt magnets, containing samarium, or ferrite magnets. The magnets 42 and 52 are not limited to permanent magnets, but may be electromagnets.

In the above embodiments, the inside diameter of the axial magnetizing part 40 is substantially equal to the outside diameter of the core 22. However, the present invention is not limited to this. For example, the inside diameter of the axial magnetizing part 40 may be smaller than the outside diameter of the core 22 if the forming guide 60 has a smaller outside diameter than that of the core 22.

The axial magnetizing parts 40 do not need to even have a circular cylindrical shape. For example, the outer peripheral shape thereof may be a regular polygonal shape, such as a regular decagonal shape.

In the third embodiment (FIG. 7), the forming guides 60 and 70 have the same length so that the magnet materials 26a filling the forming guides 60 and 70 are compressed at the same compression amount. However, this is not essential.

The compressing step performed by disposing the pair of forming guides 60 and 70 on both sides in the axial direction Da is not limited to that described in the third embodiment (FIG. 7). For example, the length in the axial direction Da of the radial magnetizing part 30 may be equal to the length in the axial direction Da of the core 22, as shown in the first embodiment (FIG. 2).

In the first embodiment (FIGS. 3A and 3B) and the second embodiment (FIG. 6), the axial magnetizing part 40 alone may be used as the source of the magnetic field without the use of the axial magnetizing part 50. Alternatively, the axial magnetizing part 50 alone may be used as the source of the magnetic field without the use of the axial magnetizing part 40.

The magnetizing step is not limited to the step including the filling step, the compressing step, and the period until the predetermined time elapses from the end of the compressing step. The magnetizing step may be, for example, a period from the start of the filling step to the end of the compressing step. This can be achieved by separating the axial magnetizing parts 40 and 50 away from the radial magnetizing part 30 at the same time as the end of the compressing step. Alternatively, the magnetizing step may include, for example, the period from the start of the compressing step to the end of the compressing step without including the filling step. This can be achieved, for example, by inserting the core 22 into the radial magnetizing part 30 and inserting the forming guide 60 into the axial magnetizing part 40 after the end of the filling step, and by separating the axial magnetizing parts 40 and 50 away from the radial magnetizing part 30 at the same time as the end of the compressing step, in the first embodiment.

The temperature of the magnet materials 26a in the magnetizing step has not been mentioned in the above embodiments. For example, even if the magnet materials 26a are at room temperature in the filling step, the magnet materials 26a are considered to be at a high temperature in the compressing step. The magnet materials may also be at a high temperature in the filling step. This case is advantageous in that the magnetization rate and the orientation rate can be easily increased.

In the above embodiments, the restraining ring 36 is made of stainless steel. However, the material of the restraining ring 36 is not limited to this. The restraining ring 36 may be made of, for example, aluminum. The restraining ring 36 does not need to be made of a nonmagnetic material.

In the second embodiment (FIG. 6), the length L1 of the radial magnetizing part 30 in the axial direction Da is the sum of the length L2 of the core 22 in the axial direction Da and the length L3, in the axial direction Da, of the portion of the forming guide 60 filled with the magnet materials 26a at the start of the compressing step. However, the present invention is not limited to this. For example, the length L1 may be larger than the sum described above, or may be smaller than the sum and larger than the length L2. Similarly, in the third embodiment, the length L1 of the radial magnetizing part 30 in the axial direction Da does not need to be the sum of the length L2 of the core 22 and twice the length L3.

In the above embodiments, the low magnetic permeability portions 34 are made of stainless steel. However, the material of the low magnetic permeability portions 34 is not limited to this. The low magnetic permeability portions 34 may be made of, for example, aluminum.

In the above embodiments, the high magnetic permeability portions 32 are made of permendur. However, the material of the high magnetic permeability portions 32 is not limited to this. The high magnetic permeability portions 32 may be made of for example, soft iron.

In the above embodiments, each of the low magnetic permeability portions 34 has the same length in the circumferential direction Dc at all radial locations thereof. However, the present invention is not limited to this. For example, the length in the circumferential direction Dc of the low magnetic permeability portions 34 may increase outward in the radial direction. This can reduce the amount of magnetic flux that does not reach the core 22.

Figure 8:
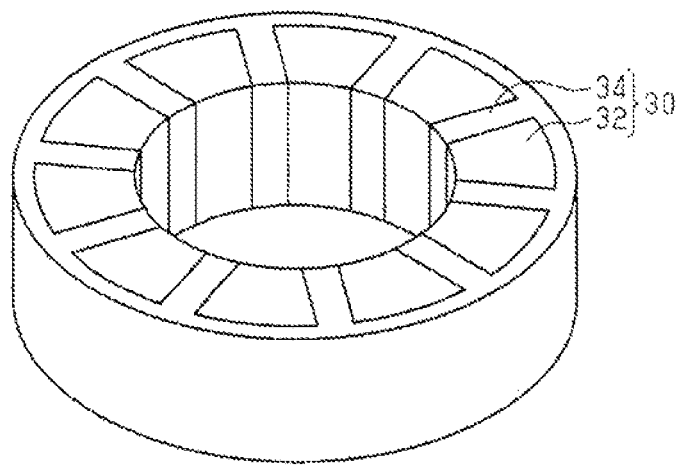
FIG. 8 is a perspective view showing a radial magnetizing part according to a modification of any of the embodiments mentioned above.

The restraining ring does not need to be included. For example, the low magnetic permeability portions 34 may form the outer periphery of the radial magnetizing part 30, and the high magnetic permeability portions 32 may be embedded on the inner peripheral side of the radial magnetizing part 30, as shown in FIG. 8.

The core 22 is not limited to the stacked structure of electromagnetic steel sheets. The core 22 may be made of, for example, cast iron or soft iron.

The permanent magnets are not limited to compression-formed magnets. The permanent magnets may be produced by injection molding, for example. In the case of injection molding, the ratio of resin in the mixture of the magnetic particles and the resin is increased to prepare the magnet material, and the magnet material is heated to have fluidity, poured into the insertion holes 24, and then cooled. Thus, the permanent magnets are formed. In this case, the magnetizing step is desirably performed while the magnet material has fluidity.

In FIG. 1, the permanent magnets 26 contained in each rotor unit 20 are disposed in the same phase in the circumferential direction Dc of the core 22, but the present invention is not limited to this. For example, in FIG. 1, the permanent magnets 26 of the rotor unit 20 located in the middle may be slightly shifted to the left in the circumferential direction Dc with respect to the permanent magnets 26 of the uppermost rotor unit 20, and the permanent magnets 26 of the lowermost rotor unit 20 may be slightly shifted to the left in the circumferential direction Dc with respect to the permanent magnets 26 of the rotor unit 20 in the middle.

The number of rotor units 20 in the rotor 10 is not limited to three. For example, the number of rotor units 20 may be two, or may be four or more. The rotor 10 may be formed by a single rotor unit 20.

The shape of the permanent magnet 26 is not limited to the U-shape, and may also be the bisected U-shape. The permanent magnet 26 may have a U-shape, or may have a V-shape, the shape of a spoke, etc. In the above embodiment, the axial magnetizing parts 40, 50 are disposed so as to face the rotor unit 20 in close contact therewith in the axial direction Da. However, the axial magnetizing parts 40, 50 may be disposed so as to face the rotor unit 20 in the axial direction Da with predetermined clearance therebetween.

The IPMSM is not limited to the IPMSM that is included in EPSs. For example, the IPMSM may be an IPMSM that is included in variable gear ratio steering systems. The IPMSM is, however, not limited to the IPMSM that is included in an actuator for steering a steered wheel.

What is claimed is:

1. A method for manufacturing an interior permanent magnet rotor unit that includes a core having a plurality of insertion holes arranged in a circumferential direction of the core and permanent magnets embedded in the insertion holes of the core, the rotor unit or a plurality of the rotor units being coupled in an axial direction of the core to form a rotor, the method comprising:
   magnetizing a magnet material filling the insertion holes by using a magnetizing device; wherein
   the magnetizing device includes an axial magnetizing part serving as a source of a magnetic field and a radial magnetizing part having an inner peripheral surface that faces the core in a radial direction of the core;
   the radial magnetizing part is formed by alternately arranging low magnetic permeability portions and high magnetic permeability portions having higher magnetic permeability than the low magnetic permeability portions in a circumferential direction of the radial magnetizing part; and
   in the magnetizing, the radial magnetizing part is disposed so that the low magnetic permeability portions face the magnet materials in the radial direction of the core, the axial magnetizing part is disposed so as to face the radial magnetizing part in the axial direction of the core, and the axial magnetizing part applies the magnetic field toward the radial magnetizing part to apply the magnetic field to the magnet materials via the radial magnetizing part.

2. The method according to claim 1, wherein
   the axial magnetizing part has a circular cylindrical shape, an inner peripheral surface of the axial magnetizing part having a diameter equal to or larger than a diameter of the core; and
   in the magnetizing, the inner peripheral surface of the axial magnetizing part is disposed so as to coincide with an outer peripheral surface of the core or so as to be located outside the outer peripheral surface of the core in the radial direction of the core.

3. The method according to claim 2 further comprising:
   filling the insertion holes with the magnet materials; wherein
   the magnetizing includes at least part of a period of the filling.

4. The method according to claim 3, wherein
   in the filling, a forming guide having guide holes is disposed so as to face an end face of the core in the axial direction of the core, and the guide holes and the insertion holes are filled with the magnet materials;
   the method includes compressing the magnet materials by inserting punches into the guide holes to apply pressure to the magnet materials in a direction from the guide holes toward the insertion holes;
   in the compressing, the guide holes each have a shape identical to the shape of the insertion holes in section perpendicular to the axial direction of the core, and extend in the axial direction of the core to be connected to the insertion holes; and the magnetizing includes a period from a start of the compressing to an end of the compressing.

5. The method according to claim 4, wherein in the filling, the radial magnetizing part has a length larger than a length of the core in the axial direction of the core, and a portion of the forming guide filled with the magnet materials at the start of the compressing and the core are disposed so as to face the radial magnetizing part in the radial direction of the core.

6. The method according to claim 3, wherin the axial magnetizing part is disposed on each side of the core in the axial direction.

7. The method according to claim 3, wherein the radial magnetizing part is a circular cylindrical member, and includes a restraining ring;

the restraining ring forms an outer peripheral surface of the radial magnetizing part; and each of the low magnetic permeability portions and the high magnetic permeability portions extends from the inner peripheral surface of the radial magnetizing part to an inner peripheral surface of the restraining ring.

8. The method according to claim 7, wherein the restraining ring is made of a nonmagnetic material.

9. The magnetizing device for use in the method according to claim 1.

* * * * *